United States Patent
Koh et al.

(10) Patent No.: US 6,704,690 B2
(45) Date of Patent: Mar. 9, 2004

(54) MONITORING SYSTEM

(75) Inventors: Soo Keong Koh, Singapore (SG); Moon Ming Seah, Singapore (SG); Teck Khiam Christopher Chia, Singapore (SG)

(73) Assignees: St. Logitrack Pte Ltd., St. Logistics Centre (SG); The National Library Board, Millenia Tower (SG)

( * ) Notice: Subject to any disclaimer, the term of this patent is extended or adjusted under 35 U.S.C. 154(b) by 0 days.

(21) Appl. No.: 09/733,701

(22) Filed: Dec. 8, 2000

(65) Prior Publication Data

US 2001/0016800 A1 Aug. 23, 2001

Related U.S. Application Data

(63) Continuation-in-part of application No. PCT/SG98/00041, filed on Jun. 8, 1998.

(30) Foreign Application Priority Data

Jun. 7, 1999 (MY) ......................................... PI 9902300
Jun. 8, 1999 (TW) ......................................... 88109657 A

(51) Int. Cl.⁷ ........................... G06F 19/00; G08B 13/14
(52) U.S. Cl. ..................................... 702/188; 340/572.1
(58) Field of Search .............................. 340/572.1, 571, 340/572.5; 235/385, 472.02; 705/28; 702/188

(56) References Cited

U.S. PATENT DOCUMENTS

| | | | |
|---|---|---|---|
| 4,153,931 A | | 5/1979 | Green et al. |
| 5,288,980 A | * | 2/1994 | Patel et al. ................. 235/381 |
| 5,963,134 A | | 10/1999 | Bowers et al. ........... 340/572.1 |
| 6,154,137 A | * | 11/2000 | Goff et al. ................ 340/572.4 |
| 6,169,483 B1 | * | 1/2001 | Ghaffari et al. .......... 340/572.3 |
| 6,201,474 B1 | * | 3/2001 | Brady et al. .............. 340/572.8 |
| 6,203,262 B1 | * | 3/2001 | Frich et al. ............. 414/331.01 |
| 6,232,870 B1 | * | 5/2001 | Garber et al. .............. 340/10.1 |
| 6,335,686 B1 | * | 1/2002 | Goff et al. ................ 340/572.4 |
| 6,424,262 B2 | * | 7/2002 | Garber et al. ............ 340/572.3 |
| 6,438,447 B1 | * | 8/2002 | Belka et al. ................. 700/214 |
| 2001/0000019 A1 | * | 3/2001 | Bowers et al. ........... 340/572.1 |
| 2001/0042055 A1 | * | 11/2001 | Didriksen et al. ........... 705/407 |
| 2002/0008623 A1 | * | 1/2002 | Garber et al. ............ 340/572.1 |
| 2002/0011967 A1 | * | 1/2002 | Goff et al. .................. 343/895 |
| 2002/0017564 A1 | * | 2/2002 | Larson et al. ............... 235/454 |

FOREIGN PATENT DOCUMENTS

| | | |
|---|---|---|
| EP | 0 372 716 A2 | 6/1990 |
| EP | 0 372 716 B1 | 4/1995 |
| JP | 9212564 | 8/1997 |

* cited by examiner

Primary Examiner—Patrick Assouad
(74) Attorney, Agent, or Firm—Ladas & Parry

(57) ABSTRACT

A library monitoring system includes a number of borrowable items. Each item has a radio frequency identification device mounted thereon and the radio frequency identification device has a unique identification code. A processing unit is coupled to a database containing an indication of the location of each library item and is coupled to a borrowing location, a borrowed item returning location and the returned item sorting location. The borrowed item returning location includes a receptacle into which the borrowed item is inserted. The receptacle includes an antenna which detects an insertion of library item having a radio frequency identification device mounted thereon. The borrowed item returning location responds to the insertion of a library item into the receptacle detects the identification code and sends the identification code corresponding to the returned library item to the processing unit. The processing unit responds to the received identification code, updates the information on the database relating to the returned library item to indicate that the returned library item has been returned to the library.

17 Claims, 4 Drawing Sheets

FUNCTION OF THE RETURNING STATION WITH CONVEYOR BELT

MONITORING SYSTEM

CROSS-REFERENCE TO RELATED APPLICATIONS

This CIP application incorporates herein by this reference PCT International Publication No. WO 99/64974, which is the published version of PCT Application No. PCT/SG98/00041 filed Jun. 8, 1998.

BACKGROUND OF THE INVENTION

1. Field of the Invention

The invention relates to a monitoring system, and especially, a system to identify and monitor the location of library items, such as books.

2. Description of Related Art

Existing library identification and tracking systems generally use a combination of a barcode system to track the location of an item being borrowed and a magnetic strip as a security device to prevent unauthorised removal of an item from the library. The disadvantages of this conventional system are that the barcodes require each book to be individually opened and the bar code scanned when the user wishes to borrow a book and for the books to be individually scanned again when they are returned. In addition, the deactivation of the magnetic strip when the item is borrowed and reactivation of the magnetic strip when it is returned are additional separate operations which are required.

As this is a labour intensive process, a number of libraries have commenced use of bookdrop bins in which users may deposit, returned books in a designated bin which is periodically emptied and the books returned are scanned when the bin is emptied not when the book is returned. Hence, this has the disadvantage that a book which is returned to the library and is in a bookdrop is not recorded in the library system as actually being returned until after the bookdrop, bin has been emptied and the books scanned. Hence, with the conventional system there are inaccuracies in the record system maintained by the library and it is not a real time reflection of the books that are located on the library premises.

In addition, a user can only borrow a certain number of books. If that number of books have been deposited in a bookdrop, the borrower is unable to borrow any further books until after the books deposited in the bookdrop have been scanned as being returned. For example, the total number of books which may be borrowed by a user may be limited to four.

There is also the additional disadvantage that sorting of the books must all be performed manually prior to returning the books to the correct location.

BRIEF SUMMARY OF THE INVENTION

In accordance with a first aspect of the present invention, a library monitoring system comprises a number of borrowable items, each item having a radio frequency identification device mounted thereon, the radio frequency identification device having a unique identification code; a processing unit may be coupled to a database containing an indication of the location of each library item, to a borrowing location, to a borrowed item returning location, and to a returned item sorting location; wherein the borrowed item returning location comprises a receptacle into which the borrowed item may be inserted, the receptacle comprising an antenna which detects an insertion of a library item having a radio frequency identification device mounted thereon, the borrowed item returning location, in response to the insertion of a library item into the receptacle, detecting the identification code and sending the identification code corresponding to the returned library item to the processing unit, the processing unit, in response to the received identification code, updating the information on the database relating to the returned library item to indicate that the returned library item has been returned to the library.

An advantage of the invention is that by having a library system in which radio frequency identification devices are mounted on the items in the library which may be borrowed, it is possible to detect when the borrowed items are returned to the library as soon as they enter a designated area.

Typically, the radio frequency identification device may also be used as a security feature, such that if it is attempted to remove a library item from the library or from an area within the library without authorisation this is detected by the processing unit which generates an alert signal which may be visual or audio.

Preferably, when the returning location detects that a library item has been inserted into the receptacle, the returning location also sends a signal to the processing unit to indicate the location to which the item has been returned.

Preferably, the processing unit is additionally coupled to a returned item sorting location. Thus, the library system may further comprise a conveying mechanism between the returning location and the sorting location, the conveying mechanism conveying returned items from the receptacle to the sorting location.

Preferably, the sorting station comprises or includes a radio frequency identification device reader which detects a library item to be sorted in the sorting station and sends an identification signal corresponding to the item to be sorted to the processing unit, in response to which the processing unit displays on a display device in the sorting location, sorting information to enable an operator in the sorting location to identify the location to which the library item is to be returned.

Alternatively, the processing unit may send a signal to an automated sorting unit, in response to the identification signal, to instruct the automated sorting unit to sort the library item to the correct location to which it is to be returned.

Preferably, the processing unit is additionally coupled to a borrowing station. Thus, the borrowing location comprises or may include a radio frequency identification device reader which reads the radio frequency identification device on a library item which a user wishes to borrow and the borrowing location sends the identification signal relating to that library item and an identification signal relating to the borrower to the processing unit, and the processing unit updates the database with the identification information relating to that library item and the borrower to show that the item has been borrowed by that borrower.

Typically, a number of returning stations may be located at different geographical locations which may be within or without the library premises.

Preferably, there may be a number of borrowing stations and typically, all the borrowing stations are located within the library premises.

In accordance with a second aspect of the present invention, a monitoring system comprises a number of items to be monitored, each monitored item having a radio frequency identification device having a unique identification code, mounted thereon; and a number of radio frequency identification device readers located within an area to be monitored; a processing unit coupled to a database containing an indication of the location of each item within the area and to each of the radio frequency identification device readers; whereby the radio frequency identification device readers perform scan operations (or whereby the processing unit instructs the radio frequency identification device readers to periodically perform a scan operation) to identify all the items within the vicinity of each reader and to send the identification codes of each item located to the processing unit, the processing unit, in response to the received identification codes from each reader, identify the location of each item located within the area and updating the database accordingly.

Preferably, the processing unit instructs the radio frequency identification device readers to periodically perform a scan operation to identify all the items within the vicinity of each reader. Further, the processing unit may preferably display a message to an operator of the system that an item is in the incorrect location if the processing unit detects that an item is in a location other than its correct location.

Preferably, the database contains information on each item, including unique identification information, the correct location of the item within the area and the actual location of the item.

Preferably, in the second aspect of the invention, the monitoring system is a library monitoring system and the items are library items. Typically, the area to be monitored is a library.

Typically, the actual location may be a location within the library which may or may not be the correct location or a location outside the library, such as that the item has been borrowed by a user of the library. dr

BRIEF DESCRIPTION OF THE SEVERAL VIEWS OF THE DRAWINGS

An example of a library monitoring system in accordance with the invention will now be described with reference to the accompanying drawings in which.

DETAILED DESCRIPTION OF THE INVENTION

Figure 1:
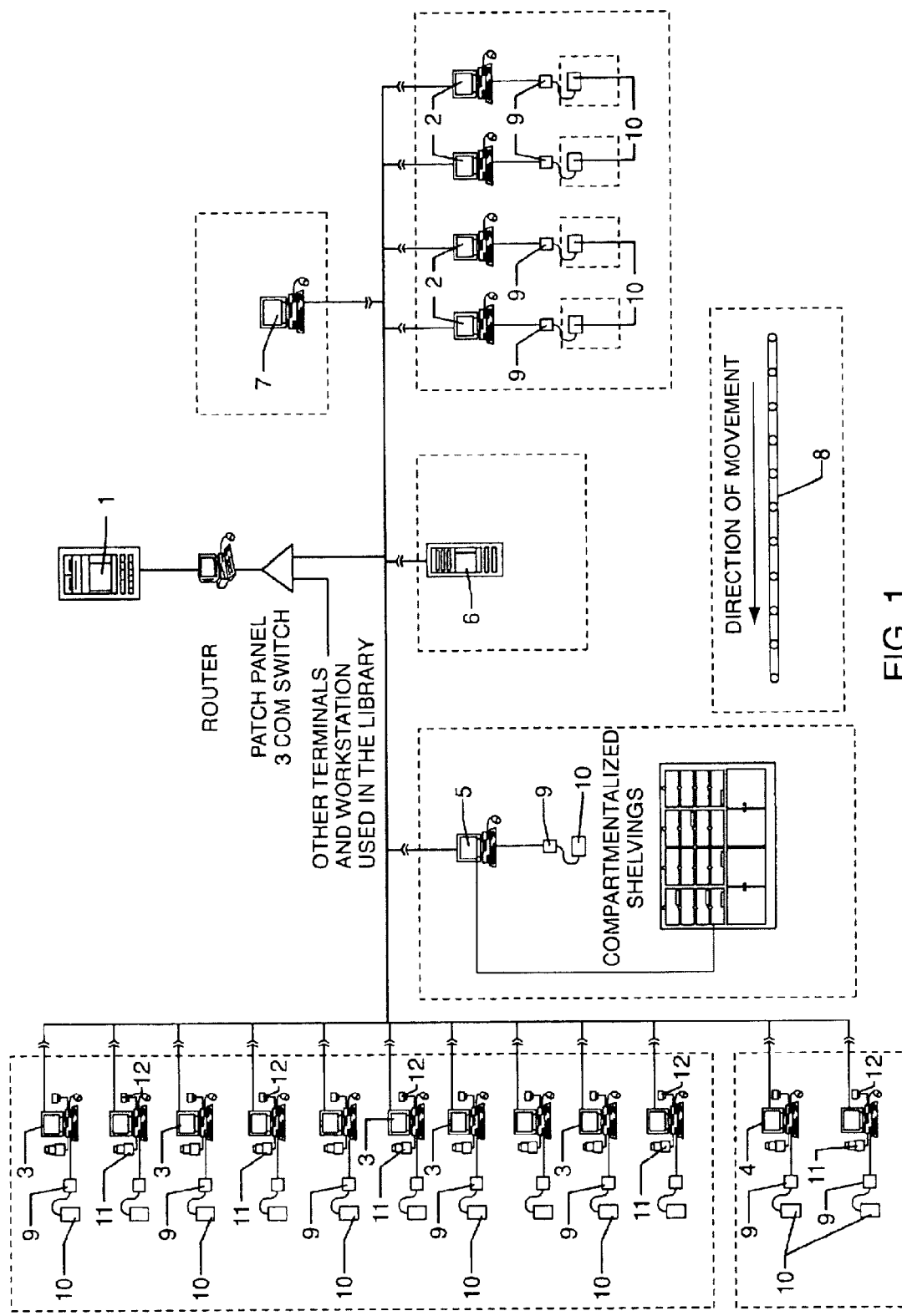
FIG. 1 is a schematic diagram showing a library monitoring system.

FIG. 1 shows a library system which includes a host computer 1 which is connected to a number of returning stations (or bookdrops) 2, a number of borrowing stations 3, two counter stations 4 and a sorting station 5. In addition, the host computer 1 is also connected to a local server 6 and a supervisory computer 7.

The library system also includes a conveyor system 8 which transports library items, such as books, videos, CDs or cassette tapes, from the returning station 2 to the sorting station 5. Each of the returning station 2, the sorting station 5, the borrowing station 3 and the counter station 4 are connected to a radio frequency identification device reader 9 and a reader antenna 10. In addition, each of the borrowing station 3 and the counter station 4 are coupled to a mini printer 11 and a barcode reader 12.

Each item in the library has a radio frequency identification device (RFID tag) mounted on it.

Figure 2:
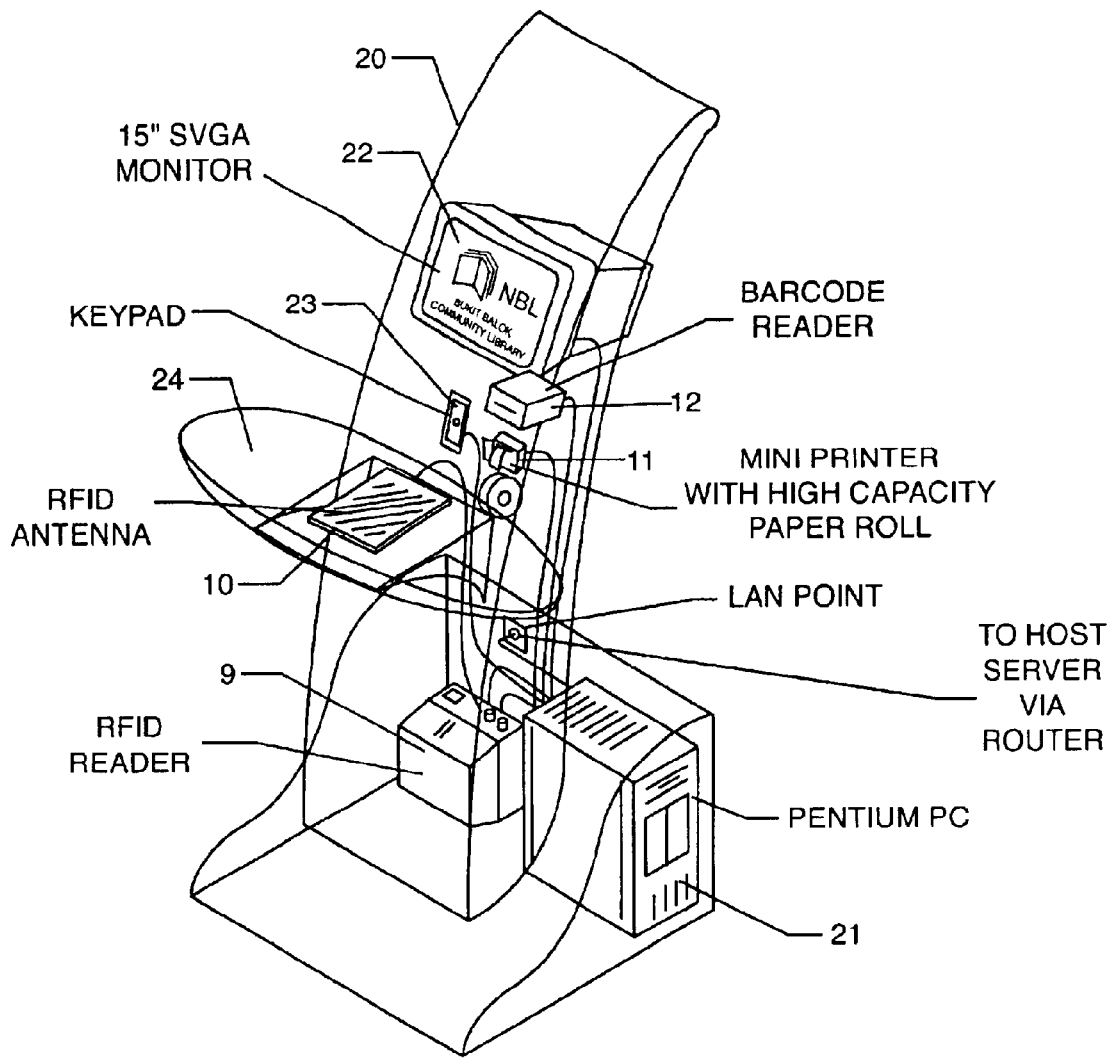
FIG. 2 is a perspective view of a borrowing station for use with the library system shown in FIG. 1.

The borrowing stations 3 are shown in more detail in FIG. 2. FIG. 2 shows that the borrowing station 3 includes a housing 20 and also includes a pentium personal computer (PC) 21 which is connected to a visual display unit 22 and a key pad 23. In addition, the antenna 10, the reader 9, the mini printer 11 and the barcode reader 12 are also mounted within the housing 20 and are coupled to the pentium PC 21. The antenna 10 is located on a desk surface 24 which forms part of the housing 20.

Figure 3:
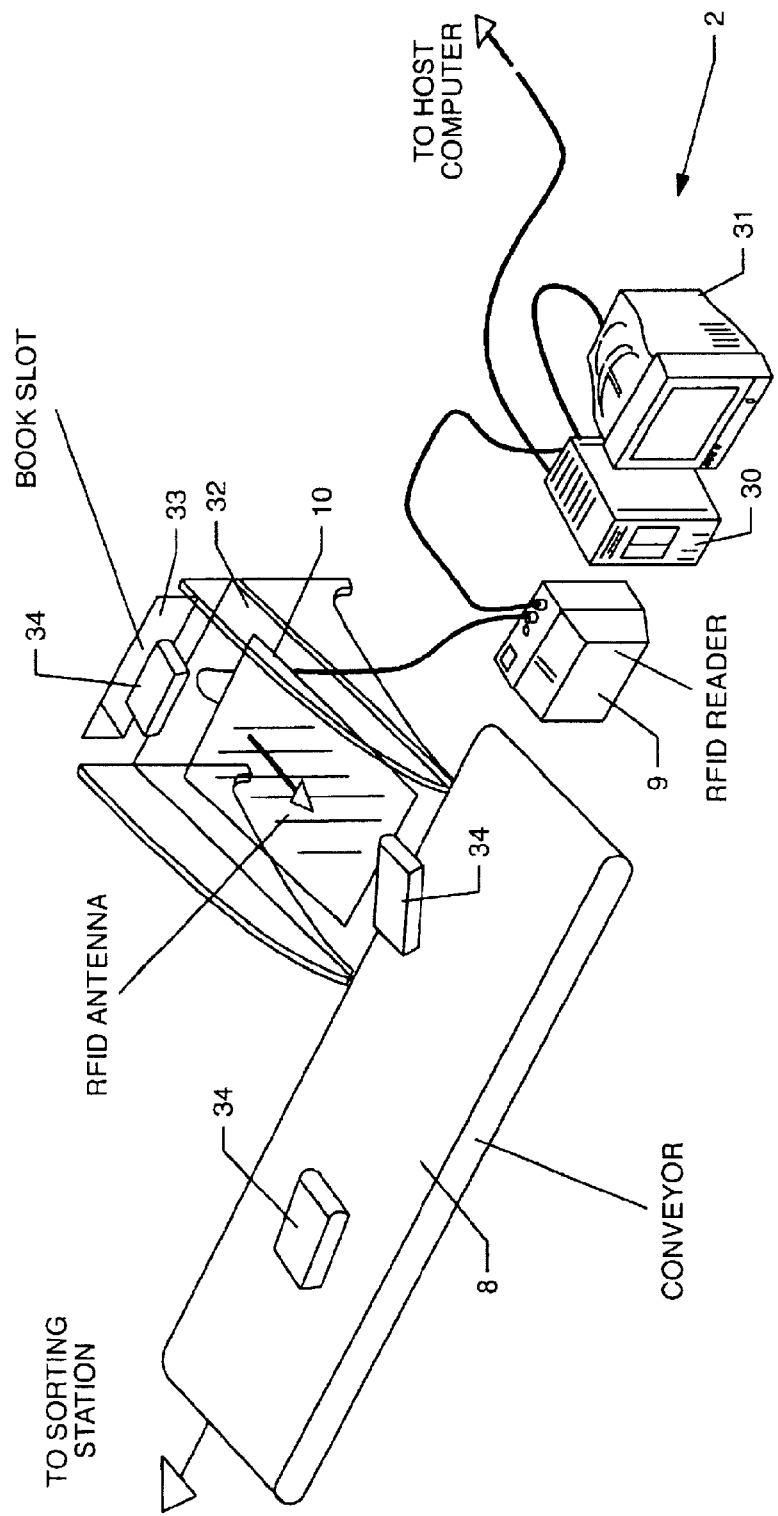
FIG. 3 is a schematic view of a returning station for use with library shown in FIG. 1; and, FIG. 4 is a schematic view of a sorting station for use with the library system shown in FIG. 1.

FIG. 3 is a schematic diagram showing a return station 2 which includes a personal computer (PC) 30 which is coupled to the reader 9 which is in turn connected to the antenna 10 and a visual display unit 31 connected to the PC 30. The antenna 10 is located within a chute 32 across which books pass after being inserted through a book slot 33 from the other side of the book slot 33 by a user returning a book 34 to the library. The conveyor system 8 is located at the bottom of the chute 32 such that books pass across the chute 32 and onto the surface of the conveyor system 8. The conveyor system 8 then transports return the books 34 to the sorting station 5.

Figure 4:
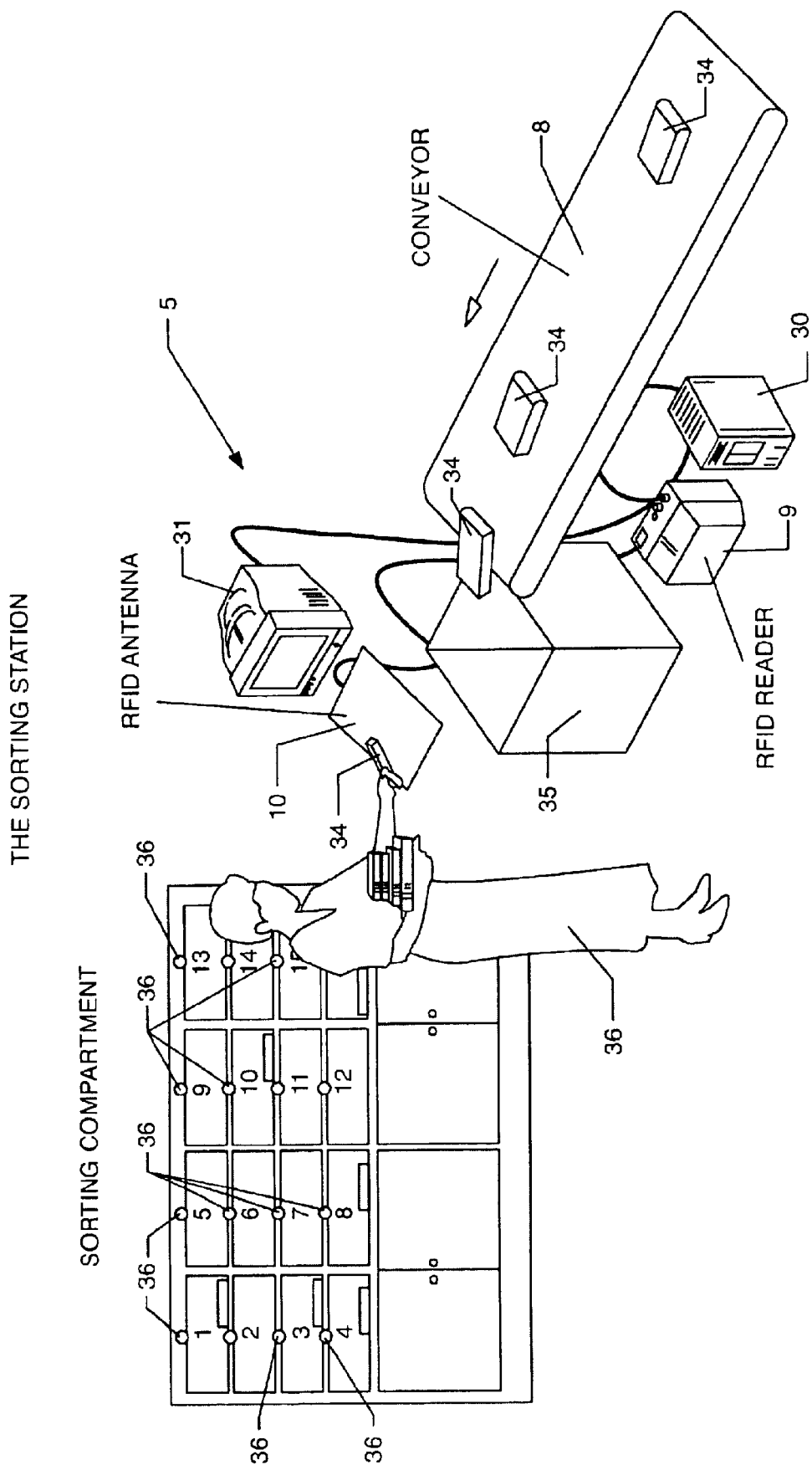

The sorting station 5 is shown in more detail in FIG. 4. The sorting station 5 includes a visual display unit 31 and a PC 30. The PC 30 is connected to the reader 9 and the reader is connected to the antenna 10. Books arrive at the sorting station 5 via the conveyor system 8 and the books 34 drop into a receiving bin 35. The books are then removed from the receiving bin 35 by an operator 36 and passed across the antenna 10 to permit scanning of the RFID located on the book 34 by the reader 9. The PC receives identification information concerning the book 34 being scanned from the reader 9 and passes the identification information to the host computer 1. The host computer 1 determines the correct location of the book 34 being scanned and illuminates a light 36 on a sorting compartment to indicate the area of the library in which the book 34 is to be returned to. The operator 36 places the book 34 in the correct compartment for return to the correct section of the library.

In use, a user may borrow a book 34 from the library by inserting the library membership card or identity card into the barcode reader 12. For multilingual use the borrowing station 3 may incorporate a multilingual interface which permits a user to select which language they wish the borrowing station to use for communicating with them during the borrowing procedure.

After inserting the library membership card or identity card, the borrowing station displays instruction on the screen and at the correct point in the borrowing procedure, the user places the book 34 above the RFID antenna 10 on the surface 24. A receipt is printed by the mini-printer 11 as each book is scanned. The PC 21 with the identification information for the book 34 from the reader 9 and the identification information of the borrower from the barcode reader 12, passes this information to the host computer 1 to permit the host computer 1 to update a database to indicate that the book borrowed is now located with the borrower corresponding to the borrower's identification card. When the user has finished scanning all the books they wish to borrow they remove the library card or identity card which activates a cutter (not shown) in the mini-printer to cut the receipt and the receipt of books borrowed is dispensed to the user.

Alternatively, the user may present the book to one of the counter stations to enable the book to be scanned by a member of the library staff as being borrowed by that user.

When a user wishes to return the book 34, the user goes to a returning station 2 and drops the book 34 through the book slot 33. The book 34 then passes over the RFID antenna 10 in the chute 32 on its way to the conveyor system 8. As the book 34 passes over the antenna 10 in the chute 32, the PC 30 reads the identification code of that book from the reader 9 and passes identification information to the host computer 1. The host computer 1 then updates its database to indicate that the book 34 dropped through the book slot 33 is now located in the library.

In addition, the host computer 1 can allocate a number of different locations to the book 34 such that when the book 34 enters the book slot 33 the book is entered in the computer database as being located at the returning station 2. When the book 34 is scanned at the sorting station the computer can update the database to indicate that the book 34 has been sorted and is located in a sorting compartment.

In addition, antennas 10 and readers 9 may be located throughout the library. These readers 9 may be interrogated periodically by the host computer 1 to determine all the books 34 in the vicinity of that particular reader 9 and update the database with the locations of the books detected in the vicinity of that reader. This has the advantage of permitting the location of all the books 34 in the library to be maintained on a virtually real time basis.

In addition to books, the same library system may be used with any other item which may be borrowed from a library, such as compact discs, cassette tapes and videos.

In addition, this system has the advantage that returning stations may be located outside the library itself and provided that the PC 30 is connected to the host computer 1 by a suitable communication link, the host computer 1 can determine the location of the bookdrop in which a book 34 has been returned. It is possible that certain bookdrops outside of the library may not be connected to the library by a conveyor mechanism 8 in which case the books may be collected manually, for example, by delivery van or courier, or other collection agencies to return the books to the library.

Advantages of the invention are that by using an RFID based system it is not necessary to manually scan each book during borrowing of the book, returning of the book and sorting of the book.

In addition, the RFID tag can also be used as a security device to minimise the risk of books being removed from the library without authorisation. Typically, the security feature is deactivated when a user borrows a book at a borrowing station 3 and is reactivated when the book is returned to the library, either at a returning station 2 or a sorting station 5. This security feature can be enable by using a memory location within an EEPROM in the RFID tag. For example, a typical EEPROM in a RFID tag will have a 128 bit memory. Approximately 75% of the memory locations are used to identify the library item. For example, if the library item is a book the identification information may include the Dewey decimal number and/or the Library of Congress classification and the library branch code to which the book belongs. One of the remaining memory bits is allocated to indicate whether the removal of the library item from the library has been authorised. Hence, if the memory location contains a "0" it indicates that removal from the library has not been authorised. However, if the memory location contains a "1" it indicates that removal from the library (for example, by an authorised user borrowing the book) has been authorised. Hence, if a person tries to remove a book from the library which has not been officially borrowed, a scanner at or adjacent to the exit of the library detects the "0" in the security memory location of the EEPROM and triggers an alarm. If the scanner detects a "1" in the security memory location of the EEPROM, the system knows the book has been officially borrowed and no alarm sounds.

This feature operates by the scanner in the borrowing station 3 writing a "1" to the memory location when an item is borrowed, and the scanner in the returning station 2 writing a "0" to the memory location when the book is returned to reactivate the security feature.

Suitable RFID tags that may be mounted on the books 34 are tags such as those manufactured by Motorola Indala Corporation, such as the mini disk tag model IT-52E or the high stress tag model IT-54E. Suitable readers 9 that may be used with the library system include Motorola Indala Corporation readers such as the IR-24E or the IR-36E long range reader, the IR-50E general purpose reader or the IR-12E compact reader.

In addition, hand held readers such as those manufactured by Motorola Indala Corporation, such as the IR-200E Geo Technology reader and the IR-2E focus point reader and the IR-100E portable reader, may be used for portable applications, such as manual scanning of books if necessary.

The invention includes a library monitoring system comprising a number of borrowable items, each item having a radio frequency identification device mounted thereon, the radio frequency identification device having a unique identification code; a processing unit coupled to a database containing an indication of the location of each library item, and to a borrowing location, a borrowed item returning location and a returned item sorting location, wherein the borrowed item returning location comprises a receptacle into which the borrowed item may be inserted, the receptacle comprising an antenna which detects an insertion of a library item having a radio frequency identification device mounted thereon, the borrowed item returning location, in response to the insertion of a library item into the receptacle, detecting the identification code and sending the identification code corresponding to the returned library item to the processing unit, the processing unit, in response to the received identification code, updating the information on the database relating to the returned library item to indicate that the returned library item has been returned to the library.

In the system described in the preceding paragraph, the returning location may send a signal to the processing unit to indicate the location to which the item has been returned when the returning location detects that the library item has been inserted into the receptacle. The library monitoring system described in the preceding paragraph may further comprise a conveying mechanism between the returning location and the sorting location, the conveying mechanism conveying returned items from the receptacle to the sorting location. In the system described in the preceding paragraph the sorting station may comprise a radio frequency identification device reader which detects a library item to be sorted in the sorting station and sends an identification signal corresponding to the item to be sorted to the processing unit, in response to which the processing unit displays on a display device in the sorting location, information to enable an operator in the sorting location to identify the location to which the library item is to be returned. In the system described in the preceding paragraph, the borrowing location may comprise a radio frequency identification device reader which reads the radio frequency identification device on a library item which the user wishes to borrow and the borrowing location sends the identification signal relating to that library item and the identification signal relating to the borrower to the processing unit, and the processing unit updates the database with identification information relating to that library item and the borrower just show that the item has been borrowed by that borrower. In the system described in the preceding paragraph, the borrowing station may write a borrowed code to a memory device within the radio frequency identification device after reading the radio frequency identification device and the returning location may write a returned code to the memory device within the radio frequency identification device in response to insertion of a library item into the receptacle. In the system described in the preceding paragraph, a number of returning stations may be located at different geographical locations. In the system described in the preceding paragraph, a number of borrowing stations may be provided within the library.

The invention also includes a monitoring system comprising a number of items to be monitored, each monitored item having a radio frequency identification device having a unique identification code, mounted thereon; and a number of radio frequency identification device readers located within an area to be monitored; a processing unit coupled to a database containing an indication of the location of each item within the area and to each of the radio frequency identification device readers; whereby the processing unit instructs the radio frequency identification device readers to periodically perform a scan operation to identify all the items within the vicinity of each reader and to send the identification codes of each item located to the processing unit, the processing unit, in response to the received identification codes from each reader, identify the location of each item located within the area and updating the database accordingly.

In the system described in the preceding paragraph, the processing unit may display a message to an operator of the system that an item is in an incorrect location if the processing unit detects that an item is in the location other than its correct location. In the system described in the preceding paragraph, the database may contain information on each item, including unique identification information, the correct location of the item within the area and the actual location of the item. In the system described in the preceding paragraph, the monitoring system may be a library monitoring system and the items may be library items.

The invention also includes a library monitoring system comprising a number of borrowable items, each item having a radio frequency identification device mounted thereon, the radio frequency identification device having a unique identification code; a processing unit coupled to a database containing an indication of the location of each library item, and to a borrowing location, a borrowed item returning location and a returned item sorting location within the library as well a number of returning stations located at different geographical locations remote from said library location; wherein the borrowed item returning location and returning stations comprise a receptacle into which the borrowed item may be inserted, the receptacle comprising an antenna which detects an insertion of a library item having radio frequency identification device mounted thereon, the borrowed item returning location, in response to the insertion of a library item into the receptacle, detecting the identification code and sending the identification code corresponding to the returned library item to the processing unit, the processing unit, in response to the received identification code, updating the information on the database relating to the returned library item to indicate that the returned library item has been returned to the library.

The invention also includes a library monitoring system comprising a number of borrowable items, each item having a radio frequency identification device mounted thereon, the radio frequency identification device having a unique identification code; a processing unit coupled to a database containing an indication of the location of each library item, and to a borrowing location, a borrowed item returning location and a returned item sorting location; wherein the borrowed item returning location comprises a receptacle into which the borrowed item may be inserted, the receptacle comprising an antenna which detects an insertion of a library item having a radio frequency identification device mounted thereon, the borrowed item returning location, in response to the insertion of a library item into the receptacle, detecting the identification code and sending the identification code corresponding to the returned library item to the processing unit, the processing unit, in response to the received to the identification code, updating the information on the database relating to the returned library item to indicate that the returned library item has been returned to the library and a conveying mechanism between the returning location and the sorting location, the conveying mechanism conveying returned items from the receptacle to the sorting location.

In the system described in any of the two preceding paragraphs, the sorting station may comprise a radio frequency identification device reader which detects a library item to be sorted in the sorting station and sends an identification signal corresponding to the item co be sorted to the processing unit, in response to which the processing unit displays on a display device in the sorting location, information to enable an operator in the sorting location to identify the location to which the library item is to be returned. In the system described in any of the two preceding paragraphs, the borrowing station may write a borrowed code to a memory device within the radio frequency identification device after reading the radio frequency identification device and the sorting station writes a returned code to the memory device within the radio frequency identification device in response to insertion of a library item into the receptacle. In the system described in any of the two preceding paragraphs, the borrowing station may write a borrowed code to a memory device within, the radio frequency identification device after reading the radio frequency identification device and the returning location or returning station writes a returned code to the memory device within the radio frequency identification device in response to insertion of a library item into the receptacle.

The invention also includes a monitoring system comprising a number of items to be monitored, each monitored item having a radio frequency identification device having a unique identification code, mounted thereon; and a number of radio frequency identification device readers located within an area to be monitored; a processing unit coupled to a database containing an indication of the location of each item within the area and to each of the radio frequency identification device readers; whereby the processing unit instructs the radio frequency identification device readers to periodically perform a scan operation to identify all the items within the vicinity of each reader and to send the identification codes of each item located to the processing unit, the processing unit, in response to the received identification codes from each reader, identify the location of each item located within the area and updating the database accordingly.

What is claimed is:

1. A library monitoring system comprising a number of borrowable items, each item having a radio frequency identification device mounted thereon, the radio frequency identification device having a unique identification code; a processing unit coupled to a database containing an indication of the location of each library item, and to a borrowed item returning location as well as a number of returning stations located at different geographical locations remote from said library location; wherein the borrowed item returning location and returning stations comprise a receptacle into which the borrowed item may be inserted, the receptacle comprising an antenna which detects an insertion of a library item having a radio frequency identification device mounted thereon, the borrowed item returning location, in response to the insertion of a library item into the receptacle, detecting the identification code and sending the identification code corresponding to the returned library item to the processing unit, the processing unit, in response to the received identification code, updating the information on the database relating to the returned library item to indicate that the returned library item has been returned to the library.

2. A system according to claim 1, wherein the returning location or returning station also sends a signal to the processing unit to indicate the location to which the item has been returned when the returning location or returning station detects that the library item has been inserted into the receptacle.

3. A library monitoring system comprising a number of borrowable items, each item having a radio frequency identification device mounted thereon, the radio frequency identification device having a unique identification code; a processing unit coupled to a database containing an indication of the location of each library item, and to a borrowed item returning location; wherein the borrowed item returning location comprises a receptacle into which the borrowed item may be inserted, the receptacle comprising an antenna which detects an insertion of a library item having a radio frequency identification device mounted thereon, the borrowed item returning location, in response to the insertion of a library item into the receptacle, detecting the identification code and sending the identification code corresponding to the returned library item to the processing unit, the processing unit, in response to the received identification code, updating the information on the database relating to the returned library item to indicate that the returned library item has been returned to the library and a conveying mechanism between the returning location and a number of sorting locations, the conveying mechanism conveying a returned item from the receptacle to one of the sorting locations according to categories informations from the identification code of the returned item.

4. A system according to claim 3 wherein the returning location also sends a signal to the processing unit to indicate the location to which the item has been returned when the returning location detects that the library item has been inserted into the receptacle.

5. A system according to claim 1, wherein the processing unit is additionally coupled to a returned item sorting location.

6. A system according to claim 5, wherein the sorting location includes a radio frequency identification device reader which detects a library item to be sorted in the sorting location and sends an identification signal corresponding to the item to be sorted to the processing unit, in response to which the processing unit displays on a display device in the sorting location, information to enable an operator in the sorting location to identify the location to which the library item is to be returned.

7. A system according to claim 1, wherein the processing unit is additionally coupled to a borrowing location.

8. A system according to claim 7, wherein the borrowing location includes a radio frequency identification device reader which reads the radio frequency identification device on a library item which the user wishes to borrow and the borrowing location sends the identification signal relating to that library item and the identification signal relating to the borrower to the processing unit, and the processing unit updates the database with identification information relating to that library item and the borrower to show that the item has been borrowed by that borrower.

9. A system according to claim 8, wherein the borrowing location writes a borrowed code to a memory device within the radio frequency identification device after reading the radio frequency identification device and the sorting location writes a returned code to the memory device within the radio frequency identification device in response to insertion of a library item into the receptacle.

10. A system according to claim 8, wherein the borrowing location writes a borrowed code to a memory device within the radio frequency identification device after reading the radio frequency identification device and the returning location or returning station writes a returned code to the memory device within the radio frequency identification device in response to insertion of a library item into the receptacle.

11. A system according to claim 3, further comprising a number of returning stations located at different geographical locations remote from said library.

12. A system according to claim 7 wherein a number of borrowing stations are provided within the library.

13. A monitoring system comprising a number of items to be monitored, each monitored item having a radio frequency identification device having a unique identification code mounted thereon; and a number of radio frequency identification device readers located at different geographical locations remote from a central location; a processing unit coupled to a database containing an indication of the location of each item within the area and to each of the radio frequency identification device readers; whereby the radio frequency identification device readers perform scan operations to identify all the items within the vicinity of each reader and send the identification codes of each item located to the processing unit, the processing unit, in response to the received identification codes from each reader, identifying the location of each item located within the area and updating the database accordingly.

14. A system according to claim 13, wherein the processing unit instructs the radio frequency identification device readers to periodically perform a scan operation to identify all the items within the vicinity of each reader.

15. A system according to claim 13, wherein the processing unit displays a message to an operator of the system that an item is in an incorrect location if the processing unit detects that an item is in a location other than its correct location.

16. A system according to any of claim 13, wherein the database contains information on each item, including unique identification information, the correct location of the item within the area and the actual location of the item.

17. A system according to any of claim 13, wherein the monitoring system is a library monitoring system and the items are library items.

* * * * *